United States Patent [19]

Winslow

[11] 4,152,408

[45] May 1, 1979

[54] FIBROUS CALCIUM SULFATE

[75] Inventor: Jerry G. Winslow, Downington, Pa.

[73] Assignee: Certain-Teed Corporation, Valley Forge, Pa.

[21] Appl. No.: 854,774

[22] Filed: Nov. 25, 1977

[51] Int. Cl.² .................. C01F 11/46; C04B 11/00
[52] U.S. Cl. ................................. 423/555; 106/109
[58] Field of Search ............... 106/109, 306; 423/555

[56] References Cited

U.S. PATENT DOCUMENTS

| 3,822,340 | 7/1974 | Eberl et al. | 423/555 |
|---|---|---|---|
| 3,835,219 | 9/1974 | Jaunarajs et al. | 423/555 |
| 3,961,105 | 6/1976 | Eberl et al. | 106/109 |
| 3,977,890 | 8/1976 | Jaunarajs et al. | 423/555 |
| 4,029,512 | 6/1977 | Jaunarajs et al. | 423/555 |

*Primary Examiner*—James Poer
*Attorney, Agent, or Firm*—John T. Synnestvedt; Ernest G. Szoke

[57] ABSTRACT

Fibrous calcium sulfate is produced by autoclaving a dilute aqueous suspension of gypsum, at a temperature between the minimum fiber forming temperature and about 20° C. above, in the presence of a dispersing agent to provide for discrete whisker crystal development and protecting the whisker crystals from destruction or conversion to a different physical or chemical form until they have been stabilized by calcining at a temperature in excess of 500° C.

8 Claims, No Drawings

FIBROUS CALCIUM SULFATE

BACKGROUND

Calcium sulfate is known to exist in several different chemical forms generally differing in gross chemical composition only by the amounts of hydrogen and oxygen expressed as water (i.e. in the same 2 to 1 ratio as in water) relative to the amount of calcium sulfate expressed as the simple salt, $CaSO_4$. In this way, the art recognizes at least; a hydrate ($CaSO_4.2H_2O$); a hemihydrate ($CaSO_4.\frac{1}{2}H_2O$); and, an anhydrite ($CaSO_4$). Additionally, the anhydrite and the hemi-hydrate exist in at least two different forms, based on different degrees of water solubility. In addition to the several different chemical forms that have been proposed for calcium sulfate, it is known to be polymorphous as well, having at least two distinct crystalline forms; rhombic and orthorhombic or monoclinic. Other crystalline variations including acicular, needle-like and whisker crystals have also been recognized. Reference to such variations in physical form, as ribbon or tape-like crystals, columnar and rod-like, twinned and swallowtailed, curved and prismatic, are frequently encountered in discussions of calcium sulfate or gypsum as the hydrated form is commonly known. Thus, it appears that authors disagree as to the exact chemical composition and the physical form of the various transformation products of gypsum. The numerous attempts to define the various forms of the product and its transformation mechanism have not removed the uncertainty as to an understanding of the composition, structure, properties, and behavior of calcium sulfate, nor provided a generally accepted correlation between them.

There, nevertheless, have been numerous attempts to explain the behavior of calcium sulfate either by transformation of physical forms or by the addition or loss of water of hydration; see for example, *The Chemistry of Cement and Concrete* by Lea and Desch (Longmans, Green & Co., New York, 1935), pages 17 to 20; *Journal of The Society of The Chemical Industry* No. 13, Vol. XXVI (July 15, 1907), pages 727–738; U.S. Pat. No. 3,594,123; U.S. Pat. No. 1,901,051. Elsewhere, such as *J. Appl. Chem.* 1968, pages 307 to 312, differences in various forms of calcium sulfate formed in autoclaving are attributed to differences in such things as purity, particle size and thermal history of the gypsum starting materials.

The commonly used crystalline form of calcium sulfate known as plaster has long been an important product of the rehydration of dehydrated gypsum stored as a powdered hemi-hydrate or anhydrite which has the ability to set when rehydrated by simply mixing with water. This property has been widely exploited by a variety of products, the most common of which is known as Plaster of Paris. Other gypsum products are known commercially as Keenes plaster, Gips and a multitude of proprietary names. These products, which generally are stated to be the hemi-hydrate or anhydrite form, are generally manufactured by dehydrating gypsum. The Plaster of Paris or similar plaster product can be made by several different processes. One commonly used process involves autoclaving ground, natural gypsum in an atmosphere of steam. All of the commercial methods for making Plaster of Paris generally seek to obtain a powdered product of uniform particle size with individual particles of minimum surface area; this is mostly done by making the particles as cubic as possible so that the minimum amount of water is necessary to wet the surface for rehydrating. In preparing these products, particularly in methods employing autoclaving, there are frequent references to the formation of undesirable acicular or needle-like crystals. Early references to needle-like crystals formed in producing Plaster of Paris can be found for example in U.S. Pat. Nos. 757,649 and 782,321. Manufacturers of Plaster of Paris products encountering the problem of acicular crystal formation sought to eliminate them either in avoiding the conditions of their formation or in breaking them up by pulverizing.

Still others have experienced the formation of needle-like crystals in autoclaving gypsum to produce plaster products where the presence of such fibrous material is generally regarded as undesirable. Thus, U.S. Pat. No. 3,410,655 is specifically directed to avoiding the formation of needle-like crystals. Only within about the last ten years has it been recognized that calcium sulfate whisker crystals could be advantageously employed as reinforcement fiber and that conditions under which acicular crystals form might be controlled to give high yield conversion of gypsum to whisker fibers having length to diameter ratio of at least 6 to 1 and as high as 100 to 1 or higher. Whisker fibers of this type have been produced for example as described by Eberl, et al in U.S. Pat. Nos. 3,822,340 and 3,961,105.

While these patents recognize a variety of uses for such fibrous calcium sulfate product, particularly as a substitute for asbestos fibers, none of the products made in accordance with these methods, has actually achieved commercial use. The lack of commercial acceptance is believed to be largely due to the difficulty in dispersing and effectively employing the fibrous product obtained as a tangled mass of fibers that cannot be readily separated. When reinforcement is attempted with such fibers they remain in the form of tangled lumps or balls and offer little practical benefit.

Accordingly, a high strength calcium sulfate fiber that is readily dispersible in liquid media is highly desirable and it is an object of this invention to provide an improved method for the production of calcium sulfate whisker crystals which can be readily dispersed for use as reinforcing fiber. A further object of this invention is to provide a method by which gypsum is converted into stable whisker crystals with average fiber length of 100 to 300 microns having strength and aspect ratio conducive to greater usefulness as reinforcement. It is a further object of this invention to provide a method wherein substantially all of the gypsum is converted to whisker crystals 50 microns long or longer and aspect ratio of 10 to 1 or greater which crystals are obtained as substantially discrete fibers easily separated and capable of being uniformly dispersed in liquid media using conventional techniques. These and other objects of the invention will be more fully understood from the description and examples which follow.

BRIEF SUMMARY OF THE INVENTION

The invention pertains to the production of fibrous calcium sulfate. More particulary, this invention comprises an improved process for producing a fibrous mass of discrete whisker crystals of calcium sulfate, which can be readily dispersed in aqueous or organic liquid media, to reinforce a variety of matrix materials such as polymeric resins, hydraulic cements, wood pulp and paper products and the like. The calcium sulfate whiskers are produced in accordance with this invention by preparing an aqueous slurry of gypsum containing about 7% by weight of gypsum and about 0.0025% by weight of tannic acid as a dispersing agent; heating the slurry to about 100° C. in a vented pressure vessel under mild agitation sufficient to maintain a uniform consistency; sealing the pressure vessel and raising the temperature, at the rate of about 1° C. per minute, to a temperature of about 120° C.; maintaining said temperature constant for about 1 hour; removing the fibrous calcium sulfate while still at the elevated temperature and filtering off the excess water under pressure; drying the resultant fiber cake at about 400° C. to effect dehydration; and, calcining at a temperature of about 600° C. for about 1 minute. If desired the drying and calcining can be performed as a single step by heating the product directly to the calcining temperature. After cooling, the calcium sulfate fiber product consists of a mass of stable fibers having an average length of between about 100 and 500 microns (with a substantial number of fibers 500 to 800 microns long and longer) and an aspect ratio of between about 10 to 1 and about 200 to 1 and higher. The fibers separate easily and can be uniformly dispersed in either organic polymeric materials such as phenolic resin molding compositions, epoxy resin compositions, etc. or in aqueous compositions such as hydraulic cement mixes.

DETAILED DESCRIPTION OF THE INVENTION

In accordance with the present invention, it has been found that a calcium sulfate whisker fiber product of markedly improved dispersibility can be made from gypsum by the autoclave method if the temperature and pressure are maintained substantially constant at or just above the minimum fiber forming conditions during substantially the entire period of fiber formation. The improved process also gives longer fibers and more complete conversion of the calcium sulfate to fibers. Further, the presence of small amounts of dispersing agent such as tannins or tannic acid during the fiber formation step eliminates the clumping or balling generally encountered during the formation of calcium sulfate whisker fibers especially when the average length exceeds about 100 microns.

As used herein, the term "calcium sulfate whisker fiber" is intended to mean any filamentary form of calcium sulfate including single crystals that have grown in filamentary form and which can be composed of any of the hydrated, hemi-hydrated, anhydrous or other calcium sulfate compositions or combinations thereof. Whereas, the whisker fibers made in accordance with this invention may be individual fibers of heterogenous compositions or different fibers may have different compositions, it is believed that generally the whisker fibers are formed as single crystals of calcium sulfate hemi-hydrate which upon calcining are converted to crystals of the anhydrite. Filamentary growth of single crystals by spontaneous extrusion or out of supersaturated medium have been known for centuries with a wide variety of substances, such as, tin, iron, graphite, aluminum oxide, sodium and potassium chlorides and others. Only a few decades ago was it discovered that whisker crystals exhibit unexpected strength especially in bending. Not until the recent work of Eberl and others exemplified by U.S. Pat. No. 3,822,340 was it realized that calcium sulfate fibers useful for reinforcement could be made from gypsum, a plentiful mineral which can either be mined as naturally occurring gypsum or obtained, as a by-product, from the treatments of certain liquid industrial waste streams.

As already discussed, calcium sulfate is known to exist in several different chemical combinations with water and one or more of these chemical forms can exist in several physical forms. The combinations and permutations of chemical and physical forms is substantial and except when otherwise specified herein, the term calcium sulfate is intended to cover all of the various forms. Where a particular chemical or physical form is specified, it will be understood that the calcium sulfate composition intended is predominantly in that form though part of the composition may be present in one or more of the transformation products.

As used herein, the term calcine is intended to mean heating calcium sulfate to a temperature in excess of about 500° C. and covers elimination of water and volatiles ordinarily removed at those temperatures as well as any transformations in the product which may occur during such heat treatment.

The term, fiber, depending on the context, is used alternatively to mean an individual filament of one or more calcium sulfate whisker crystals or collectively, the fibrous mass of calcium sulfate filaments.

The fibrous calcium sulfate produced by the method of this invention is composed of discrete fibers having an average length of about 100 to 500 microns and a diameter or average cross section of about 2 to 10 microns, with an overall average aspect ratio (length to diameter) in the range of about 50:1 to 100:1, and is substantially free of non-fibrous calcium sulfate. In referring to diameter of the fiber and to aspect ratios, it will be understood that the fibers may have varied cross-sectional configurations. As used herein the terms diameter or cross-sectional dimensions are intended to mean the average of the characteristic dimensions of the cross section.

Any commercially available gypsum, either naturally occuring mined gypsum or gypsum produced as a by-product of industrial waste treatments, such as limed spent sulfuric acid wastes, can be used as starting material. Preferably, the gypsum used will have a calcium sulfate content of 95% or greater and will be substantially free of organic impurities.

As a general matter, the presence of unknown impurities should be avoided either as an ingredient in the gypsum or in the water used in making up the gypsum slurry, since impurities, particularly some organic impurities, can materially affect the formation and quality of whisker crystals. In most instances, however, particularly in the case of dissolved inorganic salts, the effect will be to shift the minimum fiber forming temperature, as described elsewhere herein, which can be determined empirically and the process conditions adjusted accordingly. Gypsum with impurities in almost any amount can be used, if the impurity does not adversely affect the fiber formation and provided it can be tolerated as a diluent. The gypsum used in the preparation of the fiber described herein, was mined gypsum containing 96% plus of calcium sulfate dihydrate. Distilled water was used to make up the slurry though generally available water can be used without requiring any significant change in the method. As dispersing agent, there was used a reagent grade tannic acid supplied by Fisher Scientific Company, Fisher Building, Pittsburgh, Penna. Such tannic acids are used in an amount between about 1 and about 100 ppm, desirably between about 5 and about 50 ppm and preferably between about 10 and about 30 ppm of the total reaction mixture on a weight basis. There can also be utilized as a dispersing agent any of the available tannic acid or tannin products including synthetic tannins, e.g. naphthalenic syntans, and vegetable extracts, such as tea extract. A variety of tannin products are available commercially. Any of the generally available materials such as are disclosed, for example in M. Nierenstein, *The Natural Organic Tannins* (London, 1934) can be used. Other materials which function as dispersing agents without inhibiting fiber formation can also be employed. Certain of the known crystal habit modifiers have been found to assist in dispersibility as well, though in using such materials, it will be appreciated that usually the form of the product will be substantially altered as well, and the choice may be determined by the characteristics required for the fiber product. Other materials suitably employed to improve dispersibility, are for example, the polycarboxylic acids such as succinic acid or benzoic acid derivatives such as anthranilic acid. When using a dispersing agent which also modifies the crystal structure, the the concentration of the dispersing agent can be chosen so as to achieve the dispersing effect without significantly altering the crystal structure. The amount required to produce dispersion will be considerably less than the amount used for crystal habit modification.

Use of organic additives, particularly the polycarboxylic acids, such as, succinic acid, have long been known in the preparation of Plaster of Paris where these materials have been added as crystal modifiers or as agents to retard setting or curing after the plaster has been gauged. Such use as crystal habit modifiers, crystallization inhibitors, or retarding agents, are disclosed for example by U.S. Pat. Nos. 2,460,267 and 2,448,218, British Pat. No. 563,019, U.S. Pat. Nos. 3,520,708 and 2,044,942. These materials especially the preferred tannic acids or tannins, have not, however, been previously used to prevent clumping or balling of whisker crystal fibers during formation. The product fibers are obtained in readily separable form arranged in generally parallel planes and their dispersibility may be maintained during subsequent filtering, drying, and calcining. The fiber product can then be readily dispersed in an organic or aqueous liquid media using ordinary mixing and dispersing techniques to provide a uniform dispersion of reinforcing fiber throughout the product.

In carrying out the process, a gypsum slurry is prepared by mixing finely powdered gypsum with water in a mixing tank heated either directly or by steam injection. The concentration of the slurry should be between about 5% and about 10% by weight of gypsum and preferably about 7% by weight. Concentrations below 5% could be used but require handling increased volumes. Concentrations above 10% could be used but there is a gradual decrease of average fiber length as concentration is increased. The dispersing agent is added in an amount between 0.0005% and about 0.5% by weight of slurry. The exact amount of tannic acid, tannin, synthetic tannin, or other dispersing agent used will depend upon the specific choice of dispersing agent. In all cases, the amount of dispersing agent to be used is that amount which is sufficient to prevent clumping and balling without inhibiting the nucleation and development of whisker crystal fibers.

The entire mixture is maintained in suspension by stirring while the temperature is raised to about 80° to 90° C. The hot slurry is then pumped into a vented autoclave capable of being rotated, to provide mild agitation during the fiber formation, and equipped with a heating mantel and temperature control to enable the temperature of the autoclave to be elevated at a controlled rate. With the autoclave vented, the temperature is raised to about 100° C. and the autoclave is sealed. Thereafter, the pressure in the autoclave will correspond to the autogenous pressure developed by heating and, depending upon the exact composition of the slurry, it will approximate the pressure of saturated steam at the corresponding temperature. The temperature is then raised rapidly to about 112° C., after which the temperature is raised at a rate of about 0.1° C. to about 2.5° C. per minute, desirably at about 0.5° to 1.5° C. per minute and preferably at about 1° C. per minute, up to about 5° C. to 20° C. above the minimum fiber forming temperature. Generally, the temperature is raised to an optimum reaction temperature between about 115° C. and about 130° C. and held constant at that temperature for a period of up to two hours, and preferably for about 5 minutes to one hour, during which period all or substantially all of the calcium sulfate is converted to the fiber form.

The autoclaving is preferably done at a temperature no higher than about 10° C., and preferably no more than about 6° C., above the minimum fiber forming temperature. This is generally sufficient to achieve complete conversion to the whisker form in about 1 hour. It has been found that the rate of whisker formation increases as the temperature in the autoclave is increased beyond a certain minimum or threshold temperature below which whisker crystals do not form within any reasonable period of time. Such temperature is referred to herein as the minimum fiber forming temperature. As the temperature is raised beyond the minimum fiber forming temperature, fiber is formed more rapidly though it has also been found that the longest fibers and the most complete conversion of calcium sulfate to fibrous product is obtained by allowing the fiber formation to proceed at the slowest rate. In practice the temperature will be selected so as to allow for substantially total conversion to fibers within a reasonable time, say about 1 hour. The minimum fiber forming temperature can be determined by trial and error for a particular gypsum slurry depending on the quality of the gypsum and water used for make-up. When a dispersing agent is added, it generally causes the minimum fiber forming temperature to rise by about 4° to 8° C. and the temperature for the autoclave step should be adjusted accordingly. The calcium sulfate slurry is not stirred during the fiber forming period, although, gentle agitation is desired. A sufficient degree of agitation to prevent sedimentation can be easily accomplished by periodically inverting the autoclave during the fiber forming stage. Other methods for achieving gentle agitation such as use of a vertical gravity pipe reactor or other continuous autoclaving methods such as disclosed, for example, in U.S. Pat. No. 3,579,300 can be employed.

Upon completion of the fiber formation, the loose unfelted mass of fiber is separated from the excess water. The separation can be readily accomplished by pressure filtration without allowing the temperature to drop below 100° C. and preferably, not below 105° C.

The filter cake is immediately dried at a temperature in excess of 200° C. and preferably, at about 400° C. The dewatered product consists of easily separable free flowing whisker crystal fibers that have a silky feel. The reaction product is consistently recovered as fiber in quantitative yield based on the amount of calcium sulfate in the starting mixture. The pressure filtration can be conveniently carried out in a rotary pressure filter such as a BHS-FEST-Filter which is a rotating drum type filter manufactured by BHS-Werk Sonthofen, D-8972, Sonthofen, West Germany. Ordinarily, the fibrous product can be fed directly from the autoclave to the filter using the autoclave pressure, with additional steam under about the 30 psig. pressure, to maintain the product under pressure during the entire removal and filtering operation while the water content is reduced to less than about 50% by weight of water in the filter cake. As the product is removed from the filter, the individual fibers appear layered in the filter cake or mat indicating little three dimensional entanglement and it is desired to maintain the fiber mass free of such entanglement during the subsequent drying and calcining. In order to do so, the drying and calcining are preferably carried out by transferring the fiber mat, as removed from the filter, onto an endless conveyor belt and passing it through an oven for drying and calcining. Alternatively, the fiber mass can be dried and calcined by other conventional means. It is, however, preferred to minimize the amount of tumbling in order to maintain the individual fibers relatively free of entanglement to permit easy fiber dispersion when subsequently mixed with a resin or cement.

Calcining is carried out at a temperature between about 500° C. and about 650° C., preferably at about 600° C., for a period of less than 15 minutes and mostly for no longer than about 1 minute in order to avoid degradation of the product. The pH obtained with the final product immersed in water should not exceed pH 10 and preferably should be less than pH 8. Lower pH is obtained by lower calcining temperatures and shorter calcining times.

After removal from the calciner, the product is allowed to cool in air. This product, which is believed to consist of the insoluble anhydrite of calcium sulfate, will remain stable for periods up to a year and longer; it will not readily reconvert to hydrated forms in the presence of moisture so that it can be used to reinforce aqueous matrix materials such as the hydraulic cements. Alternatively, if the product is to be used in an organic resin matrix, without a preliminary prolonged exposure to moist air, it can be used without calcining simply removing it from the drying stage and cooling. The bulk density of the product after calcining is between about 10 and 20 lbs. per cubic foot, usually about 15 to 18 lbs.; the product can be readily compressed up to about 30 lbs. per cubic foot without damaging the individual fibers.

The calcium sulfate fibers are sufficiently stable after drying for use as reinforcement in nonaqueous systems and after calcining for use in aqueous media. However, if desired, the fiber can be coated as described by Eberl, et al. U.S. Pat. No. 3,961,105, the disclosure of which is hereby incorporated by reference. If a coating is applied, it is necessary only to dry the product to a water content of less than 1% which is generally accomplished by drying at 300° C. to 400° C. for about 5 to 15 minutes. As described herein the process is essentially a batch process, though it can be made continuous by use of a continuous pressure reactor for the autoclaving step. In either batch or continuous, it is important that the handling, from the fiber forming stage to completion, be done with a minimum of mechanical agitation, tumbling, shearing and the like, which would cause the fiber to clump or ball making it difficult to disperse uniformly in the subsequent product.

If desired, the water removed in filtering can be recycled to the slurry stage with additional make-up water as required. In recycling a certain amount of the dispersing agent is retained in the water and the amount added in make up of additional slurry must be adjusted accordingly.

If desired, coatings can also be applied to the fibers to improve the wetability or the adhesion of the fibers to the plastic component when used as a reinforcing fiber with, for example, phenol formaldehyde, urea-formaldehyde, melamine formaldehyde, polyurethane or other polymers. The use of such coatings is disclosed in Eberl, et al U.S. Pat. No. 3,961,105, the disclosure of which is hereby incorporated.

The calcium sulfate whisker fibers prepared by the method of this invention as already stated are useful as reinforcing agents for either organic or inorganic matrix materials, particularly, the synthetic polymers. These fibers are especially suited for blending with organic or inorganic matrix materials in liquid or in dry solid form.

Various methods of dispersion and blending of the fiber in the plastic or other matrix materials can be employed, although properties, especially mechanical proproperties, of the resultant composite materials may be affected by the choice of dispersing means. Many varieties of commonly used processing equipment, such as, single and twin screw extruders, two-roll mills and Banbury mixers can be used to produce excellent dispersions. The equipment must be specifically run to produce good fiber dispersion in the plastic matrix with a minimum amount of damage to the fiber.

A two-roll mill can be advantageously used to blend into small batches of thermoplastic materials. Usually, two-roll mills are operated under atmospheric conditions. As with other types of processing equipment, the plastic material should be fluxed on the mill before the addition of fiber. It is recommended that the roll stock be removed by a doctor blade or other means and then returned to the mill. In order to attain recommended shear levels, it is suggested that nip clearances greater than 25 mils be used and that the roll speeds be in the range 100 to 125 r.p.m. with a speed differential of 25 r.p.m. It is apparent that the temperature at which the rolls are maintained is dictated by the properties of the plastic material being worked. As a guiding principle, roll temperatures should be maintained at such a level that addition of the fiber to the plastic roll stock causes the resultant roll stock to lost tackiness and thus become easily workable.

A Banbury mixer can also be employed. As in the case of the two-roll mill discussed above, it is very important that the plastic material be in a condition of flux before addition of the fiber. This is best accomplished by feeding the plastic into a heated hopper or holding bin and then holding it under force in the mixing area until fluxing is observed. Upon completion of fluxing the fiber may be added. The blending should then be continued for a period of time sufficient to achieve the desired distribution of fibers. It is necessary to control the viscosity of the fluxed resin/fiber composite. This can be done by controlling the melt temperature by means of varying speed of rotation, cycle time and the circulation through the rotors of either steam or water as the situation requires. Generally speaking, it is possible to increase the blending time so that improved dispersion may be attained without degrading the fiber.

For example, a typical compounding cycle for a thermoplastic material would total three minutes. Twenty seconds would allow fluxing to occur, and forty seconds would suffice to add the fiber. Thus, two minutes are available for the blending process. A temperature rise during the final two minutes of the cycle is commonly observed.

For extrusion, single or twin screw extruders can be used to compound the fibers into resin compositions. The temperature variation along the length of a twin screw extruder should be controlled so that fiber degradation is kept to a minimum. Generally speaking, with higher melting polymers, such as nylon, the temperature in the feed section should be maintained about 25° to 50° C. above the required melt temperature for the polymer involved. In the case of low melting polymers such as polyolefins, it is suggested that the feed section be maintained 10° to 30° C. above melt temperature. The temperature profile in the barrel will depend on the speed of rotation of the screws since this dictates the time the solid resin remains in the feed section. Thus, larger temperature differences between feed and completion sections are required at higher screw rotations.

It is essential to recognize that degradation of fiber during the extrusion process may occur before the fluxing of the resin. Accordingly, configuration of the screws should be such that the fiber and resin mix are gently conveyed until softening of the resin occurs by the transfer of sufficient heat. Once fluxing has taken place, much compressive and dispersive working can be accomplished with little or no degradation of the fiber. Reduction of compression in the feed section can be accomplished by using deeper channels here than in the remainder of the screw. Good engineering practice would suggest a gradual reduction in screw pitch following the feed section to avoid a situation of immediate compression of the material. It is desirable that the screw design incorporate kneading blocks since these are known to aid in dispersion of the fiber. In accordance with the information given above, these kneading blocks should be placed in a section where the polymer has already melted so that unnecessary mechanical working is avoided.

In general, standard designs and configurations for dies and adapters are suitable for use in fiber extrusion and those configurations commonly used for PVC, work well.

Combinations of calcium sulfate fiber and other reinforcing fiber, such as chopped fiberglass, can be used for example in polyester, or the calcium sulfate fiber can be used to replace fiberglass. Cast composite specimens of polyester resin and calcium sulfate fiber containing 5.5% by volume or approximately 13% by weight of fiber are prepared by dispersing the fiber in a polyester resin stirring and curing at room temperature using 0.75% by weight methyl-ethyl-ketone peroxide as a curing agent. Residual air is removed from the mix under a vacuum of about two millimeters mercury for a time period of about 5 minutes.

The fiber is dispersed easily and gives a pourable mixture of fairly low viscosity. The composite mix is then cast into a block with dimensions approximately one quarter inch thick by three inches wide by six inches long. The test blocks are allowed to set at room temperature and are then post cured at 110° C. for 30 minutes. The mechanical properties of these polyester/fiber composites compare well with corresponding asbestos and fiberglass reinforced composites.

Calcium sulfate fiber can be bonded with magnesium oxysulfate (Sorel Cement). By way of example, a mixture composed of: calcium sulfate fiber, 38.7 wt. %; magnesium oxide, 13.6 wt. %; magnesium sulfate, 4.8 wt. %; Natrosol 250, 1.0 wt. %; Duponol ME (dry), 0.3 wt. %; and water, 41.6 wt. %, is prepared by adding the water all at once and using a high speed mixer to foam the mix. The mix, which appears to be dry at first, becomes a heavy foamy mass with continued mixing and is suitable for use as a foam-in-place insulation.

The whisker fibers can also be used in place of or in combination with asbestos in other applications such as for reinforcement in cast magnesia cement compositions and the like.

Particularly useful products prepared by using the calcium sulfate fiber prepared in accordance with this invention, are the formulations for friction elements such as brakes, clutches, transmission bands, etc. wherein the calcium sulfate fiber is used to replace part or all of the asbestos fiber presently employed in such formulations. Formulations for friction elements generally utilize phenolic resins of the pulverized novolak type. These resins are utilized primarily in dry mix processes for the production of disc pads, linings and truck blocks. A suitable formulation is prepared by blending about 35 to 75 parts preferably about 60 parts by weight of calcium sulfate fiber prepared in accordance with the process of this invention, with about 10 to 15 parts preferably about 13 parts by weight of barytes, about 5 to 10 parts preferably about 7 parts by weight of Cardolite brand epoxy resin flexibilizer made by the 3M Company of Minnesota, and about 15 to 25 parts preferably about 20 parts by weight of a phenolic resin of the novolak type. If desired the fiber ingredient can be used as a blend, suitably at a ratio of between about 1 to 1 and about 4 to 1 of calcium sulfate fiber to asbestos. The blended formulation is compression molded at about 200° C. and post cured for about 8 hours at about 230° C. The cured friction element when evaluated by various friction testing procedures, which are standardized in the industry show the calcium sulfate fiber to be an acceptable reinforcing material, particularly, for light duty applications and as a diluent for asbestos. The calcium sulfate fiber is especially beneficial for improved wear performance.

The following examples are given by way of illustrating the improved gypsum transformation process for producing an improved dispersible calcium sulfate fiber product.

EXAMPLE 1

Twenty-two grams of a commercial gypsum (Terra Alba) is slurried in 200 cc of water (a concentration of 10% by weight of total slurry). The slurry is heated to a temperature of about 80° C. and pumped into an autoclave equipped with an electric heating mantel and Variac control. With the autoclave vented, the temperature is raised to about 100° C. and maintained until substantially all air is removed. The vent is then sealed and the temperature raised to about 116° C. for about 15 minutes after which, the temperature is raised to about 126° C. and held for an additional 40 minutes at which time the transformation to whisker crystals is complete. The slurry is maintained in suspension throughout by mild stirring or rotating the autoclave periodically. Excess water is removed and the remaining fibrous mass is dewatered. The excess of supernatant water is first blown out of the autoclave without cooling using the pressure from the autoclave. A sample of the fibrous product is removed and put into ethylene glycol to prevent rehydration. Other organic water immiscible solvents such as acetone, ethanol, etc. could be used. The solvent is removed under vacuum and the sample fibers are examined under the microscope. The product is composed of whisker crystals having an overall average length of about 200 microns and cross sectional dimensions of about 2 to 3 microns. The remaining product while maintained at a temperature over 100° C. is filtered under pressure, the filter cake is transferred immediately to an oven where it is dried to about 1% moisture content at about 400° C. for about 15 minutes. The dried fiber is then fed to a calcining oven and rapidly heated to about 600° C. and held at that temperature for no longer than about 0.5 to 1.5 minutes. After cooling the product remains unchanged indefinitely.

EXAMPLE 2

The experiment is carried out as in Example 1 except that before autoclaving, tannic acid (Fisher Chemical) in an amount equal to 0.0025% by weight of the total, is added to the gypsum slurry. After venting and sealing the autoclave, the slurry is heated to 116° C. and held for 15 minutes. The mixture is then heated to 122° C. and held for an additional 20 minutes after which, the partially reacted product is heated to 128° C. for an additional 20 minutes. The sample fibers examined under the microscope are between 200 and 300 microns long with some even longer and an average diameter of 4 to 5 microns. The reaction mixture from the autoclave has a low viscosity and is easily pourable. The filter cake is similar in appearance to that of Example 1 but with little or no three dimensional intermingling of fibers and a layered appearance.

EXAMPLE 3

This experiment is carried out as in Example 2 except that the reaction is stopped at 124° C. after about 20 minutes and partial fiber formation. The product is cooled and reheated to 128° C. for about 20 minutes. The sample fibers are flat ribbon-like crystals, 200 to 300 microns long and longer with cross sectional dimensions of about 5 to 10 microns. The filtered product is similar in appearance to that obtained in the preceding example.

EXAMPLE 4

A solution of succinic acid is prepared by dissolving 0.0712 grams of succinic acid in 300 cc of water. Experimental runs are carried out as in Example 1 using a 7% by weight gypsum slurry. The autoclaving is done at 130° C. for 45 minutes. Three separate autoclave runs with slurries containing, respectively 1 cc, 2 cc, and 4 cc of th succinic acid solution are carried out. The sample fibers removed from each product and examined under the microscope were rod-like crystals having the following average dimensions:

with 1 cc succinic acid
   length 150 microns
   diameter 2 microns
with 2 cc succinic acid
   length 150 microns
   diameter 2 microns
with 4 cc succinic acid
   length 80–100 microns
   diameter 5–7 microns The filtered and dried products are similar in appearance to those of preceding examples with little three dimensional mixing.

EXAMPLE 5

This experiment is carried out as in Example 4 by adding 0.15% by weight anthranilic acid to the slurry instead of succinic acid. The sample fibers had an average length of 150 microns and an average diameter of 2 to 3 microns and the filtered and dried fiber product is easily separated into discrete fibers similar to that obtained in the previous experiments.

EXAMPLE 6

This experiment is carried out similar to the procedure of Example 5 using a 7% by weight gypsum slurry to which is added 0.007% by weight succinic acid and 0.15% by weight anthranilic acid. The autoclaving is carried out for 35 minutes at temperatures between 122° and 134° C. The sample fiber had an average whisker crystal length of 150 microns and an average diameter of 5 to 8 microns.

EXAMPLE 7

This experiment is designed to effect complete fiber formation as rapidly as possible. 500 cc of water is heated to 135° C. in a one liter autoclave. Simultaneously, 45 grams of gypsum slurried in 100 cc of water is heated to 110° C. in a pressure vessel connected to the autoclave. The gypsum slurry is fed by air pressure from the pressure vessel into the autoclave. The feed time is about 2 minutes and the mixture is maintained at 135° C. in the autoclave for an additional 3 minutes at which time, the pressure is released and a fiber sample taken. The conversion goes substantially to completion. The fiber sample examined under a microscope has the following composition:

12 to 15% unreacted material
3 to 5% fiber 0 to 50 microns long
3 to 5% fiber 100 to 500 microns long
remainder fiber 50 to 100 microns long.

EXAMPLE 8

A series of reactions are carried out to determine the minimum fiber forming temperature and the effect of temperature on the rate of fiber formation and quality of fiber product. The operating procedure used is as follows:

A slurry of commercially mined gypsum having a minimum of 96% calcium sulfate dihydrate content is prepared by mixing sufficient gypsum with 500 cc of distilled water to prepare a 7% by weight suspension of gypsum. The slurry is stirred constantly while heating to a temperature of about 80° C. The slurry is then pumped into a one liter autoclave having a full electric heating mantel with Variac control, a thermal well, pressure gauge and air driven stirring motor. The reacting slurry is physically mixed by an air driven propeller rotating at about 120 r.p.m. to keep the gypsum totally in suspension.

a. Temperature at 110° C. for 2 hours—
    zero fiber formation
  b. Temperature at 112° C. for 2 hours—
    at ½ hr.—5% fiber formation
    at 1 hour—25% fiber formation
    at 2 hours—80% fiber formation
  c. Temperature at 114° C.— at ½ hr.—8% fiber formation
at 1 hour—25% fiber formation
at 1 hr. 20 min.—total fiber formation.

From these experiments, it can be concluded that the minimum fiber forming temperature for this slurry is about 112° C. and the rate of fiber formation increases with temperature such that complete conversion can be achieved in about 1 hour at about 116° C. The minimum fiber forming temperature and rate of conversion are also dependent upon concentration and other materials present in the slurry.

EXAMPLE 9

A group of experiments is run using a 250 milliliter Parr Bomb reactor and a stirrer running at high speed until the temperature is nearly at the minimum fiber forming temperature (ca 110° C.) and thereafter, the gypsum is maintained in suspension by rotating the reactor a full 360° about every two minutes while the temperature is raised at a controlled rate to 140° C. The controlled rates of temperature increase are 2.5° C./min., 1° C./min., and 0.5° C./min., respectively. In each instance, the conversion goes substantially to completion. Examples of the fibers produced in each case have the following composition based on total number of fibers in the sample.

at 2.5° C./min.
Length:
 0 to 50 microns 5–7%
 50 to 100 microns 28–30%
 100 to 200 microns 50–52%
 200 to 300 microns 14–16%
at 1.0° C./min.
Length:
 0 to 50 microns 4–5%
 50 to 100 microns 8–10%
 100 to 200 microns 27–30%
 200 to 300 microns 28–30%
 300 to 400 microns 14–16%
 400 to 500 microns 10–12%
at 0.5° C./min.
Length:
 0 to 50 microns 4–5%
 50 to 100 microns 4–5%
 100 to 200 microns 16–18%
 200 to 300 microns 20–30%
 300 to 400 microns 22–24%
 400 to 500 microns 24–26%

A similar experiment is carried out with 0.0125% by weight tannic acid added to the slurry. The product formed has lower viscosity, is easily poured, has about the same distribution on length of fibers, a somewhat larger average diameter and is considerably more easily dispersed.

EXAMPLE 10

In this experiment a fiber sample prepared according to Example 2 followed by drying at 400° C. and calcining at 600° C. for 1 minute is tested to determine its reinforcing characteristics in commonly used engineering thermoplastics. Separate samples for injection molding were prepared using nylon and polyester. Pelletized resins of Nylon 6,6 (Zytel 101 available from DuPont Corporation, Wilmington, Del.) and polyester (Valox 310, available from General Electric Corporation, Pittsfield, Mass.) are used as the resin. The nylon and polyester pellets are ground separately to about 50 mesh, and each is blended with 50% by weight of calcium sulfate fiber prepared as above to provide injection molding samples of reinforced nylon and reinforced polyester. Substantially no clumping and balling occurs during blending. In each case, the blend is dried for 2 hours at 100° C. The resin/fiber pellet is injection molded in a five-ounce Van Dorn hydraulic press capable of 75-ton clamp pressure according to the conditions below:

| Temperatures (°C.) | Nylon | Polyester |
|---|---|---|
| rear cylinder | 300 | 238 |
| front cylinder | 313 | 241 |
| nozzle | 316 | 243 |
| mold | 135 | 66 |
| melt | 316 | 243 |
| back pressure (psi) | 50 | 50 |
| injection pressure (psi) | | |
|  stage I | 1500 | 1500 |
|  stage II | 1300 | 1300 |
| injection speed (sec) | | |
|  stage I | — | — |
|  stage II | 1.5 | 2.5 |
| mold case (sec) | 30 | 30 |
| injection forward (sec) | 4.0 | 4.0 |
| screw speed (rpm) | 70 | 70 |
| total cycle time (sec) | 34 | 34 |

The resulting reinforced molded plastic is subjected to the following tests:

| Test | |
|---|---|
| Flexural: | Strengths and moduli are measured on a Baldwin-Tate-Emery Testing machine according to ASTM D-790. |
| Tensile: | Strengths are obtained according to ASTM D-638 on an Instron testing machine. |
| Wet Tensile: | Tests are conducted on specimens exposed to 50° C. water for 24 hours. |
| Heat Distortion: | Tests are performed with a Tinius Olsen HDT bath using phenyl silicone oil elevated at a rate of 2° C. per minute (ASTM D-648). |
| Izod Impact: | Notched and unnotched tests are performed according to ASTM D-256. |
| Modified Gardner Impact Test: | A ½ lb. weight is dropped until the bottom of a 4"×2½"×⅛" plaque exhibited a fracture. |

Results

| | Nylon | Polyester |
|---|---|---|
| Flexural Strength, psi | containing 50 wt. % calcium sulfate | containing 50 wt. % calcium sulfate |

|  | fiber | fiber |
|---|---|---|
| Dry | 19,000 | 14,000 |
| Wet | 9,000 | 11,000 |
| Tensile Strength, psi | 11,000 | 8,000 |
| Izod Impact |  |  |
|   Notched ft.lb./in. | 0.5 | 0.5 |
|   Unnotched | 4.0 | 4.0 |
| Gardner Impact, in.lb. | 3.5 | 3.5 |
| Heat Deflection Temp., °F. | 450 | 350 |

Scanning electron microscope studies of fracture surfaces of the calcium sulfate whisker fiber reinforced nylon show good fiber distribution and a good degree of bonding between matrix and reinforcement.

EXAMPLE 11

Calcium sulfate fibers prepared by using a dispersing agent in accordance with the methods of Examples 2 and 9 are prepared by evaluation as reinforcement for PVC pipe using powdered compound with the fiber added in a later stage of the blending cycle. Pipe extruded from PVC compound blended with 20 and 30 parts of calcium sulfate fiber per hundred parts of resin show good impact and a high modulus of elasticity. The physical properties of the fiber reinforced PVC pipe are shown below with comparison to extruded PVC pipe using asbestos. PVC powder compound is used for all pipe extrusion; the reinforcement being introduced with the compound at the blender.

| Physical Properties of Reinforced PVC | | | |
|---|---|---|---|
|  | Calcium Sulfate Fiber | | Asbestos |
| Physical Property | 20 pts. | 30 pts. | 20 pts. |
| Modulus (Long) | 676,000 | 786,000 | 550,000 |
| Modulus (Cir.) | 585,000 | 691,000 | 556,000 |
| Tensile (Long) | 6,600 | 6,200 | 5,810 |
| Tensile (Cir.) | 6,400 | 4,830 | 5,460 |
| Impact 23° C. |  |  |  |
| Ave. ft.-lb./in. wall | 1,050 | 185 | 195 |

I claim:

1. A method of preparing a dispersible calcium sulfate fiber which comprises heating to a temperature above about 110° C. under autogenous pressure, an aqueous suspension comprising between about 5% and about 10% by weight of gypsum and between about 1 and 100 ppm based on the total weight of the gypsum suspension of tannic acid or a tannin as a dispersing agent, and thereafter recovering the fiber mass substantially free of three-dimensional entanglement by filtering and drying.

2. A process according to claim 1 wherein dispersing agent is tannic acid in an amount between about 5 and about 50 ppm based on the total weight of reaction mixture.

3. A process according to claim 1 wherein the dispersing agent is tannic acid in an amount between about 10 and about 30 ppm based on the total weight of reaction mixture.

4. A process according to claim 1 wherein the fiber product obtained on completion of heating under autogenous pressure is recovered by filtering under pressure, and thereafter drying and calcining said fiber while maintaining the temperature above about 100° C. throughout the entire process.

5. A process according to claim 1 wherein said aqueous suspension of gypsum and tannic acid or tannin is heated under autogenous pressure until the minimum fiber-forming temperature is reached, and thereafter continuing to heat at a rate such that the temperature rises no more than 2.5° C. per minute until substantially all of the gypsum is transformed to fiber.

6. A process according to claim 5 wherein the minimum fiber-forming temperature is between about 115° C. and about 120° C. and the temperature of the reaction mixture is raised above the minimum fiber-forming temperature at a rate of no more than about 1° C. per minute.

7. A process according to claim 4 wherein the product is dried at about 400° C. and then calcined at a temperature above about 500° C. for a period of about 0.5 minute to about one hour.

8. The calcium sulfate fiber product prepared in accordance with the process of any of claims 1 to 7.

* * * * *